T. E. FRIEND.
INTERNAL COMBUSTION ENGINE.
APPLICATION FILED SEPT. 24, 1909.
1,005,701.
Patented Oct. 10, 1911.
3 SHEETS—SHEET 1.
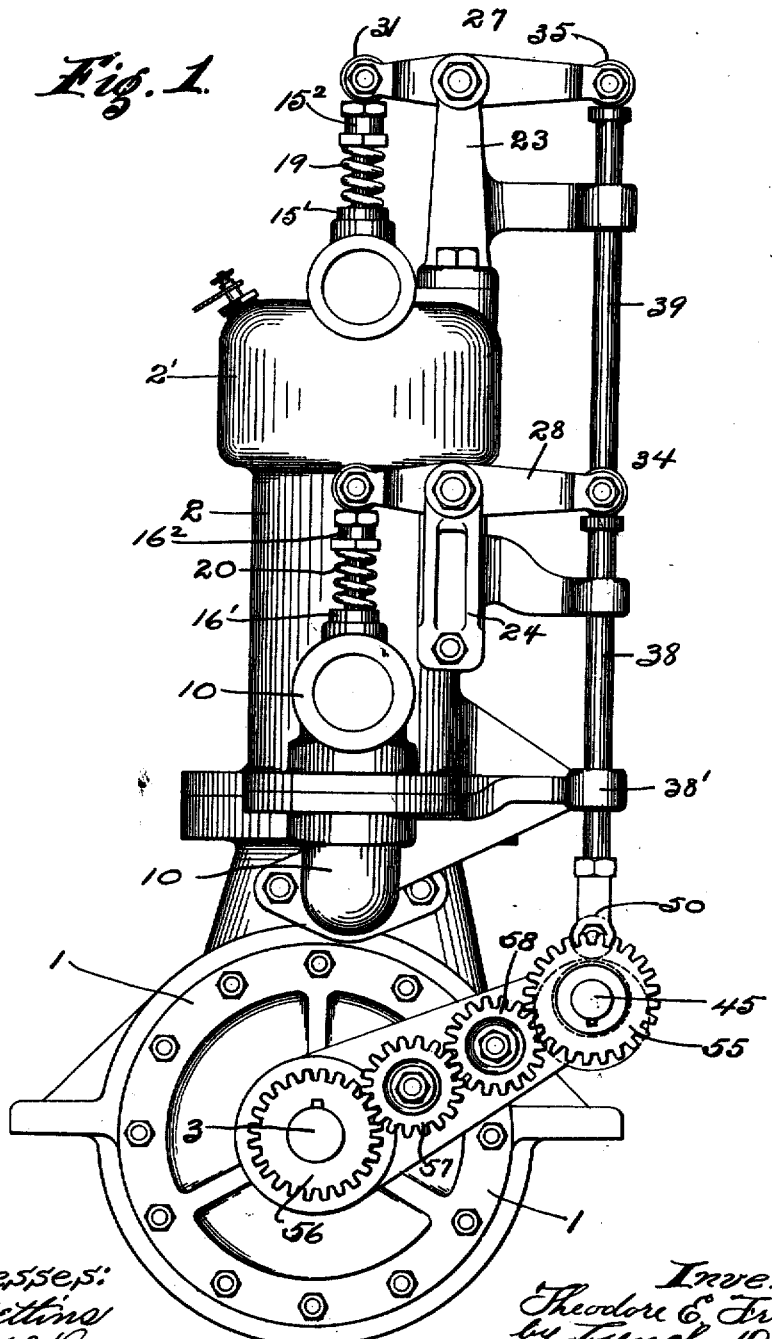

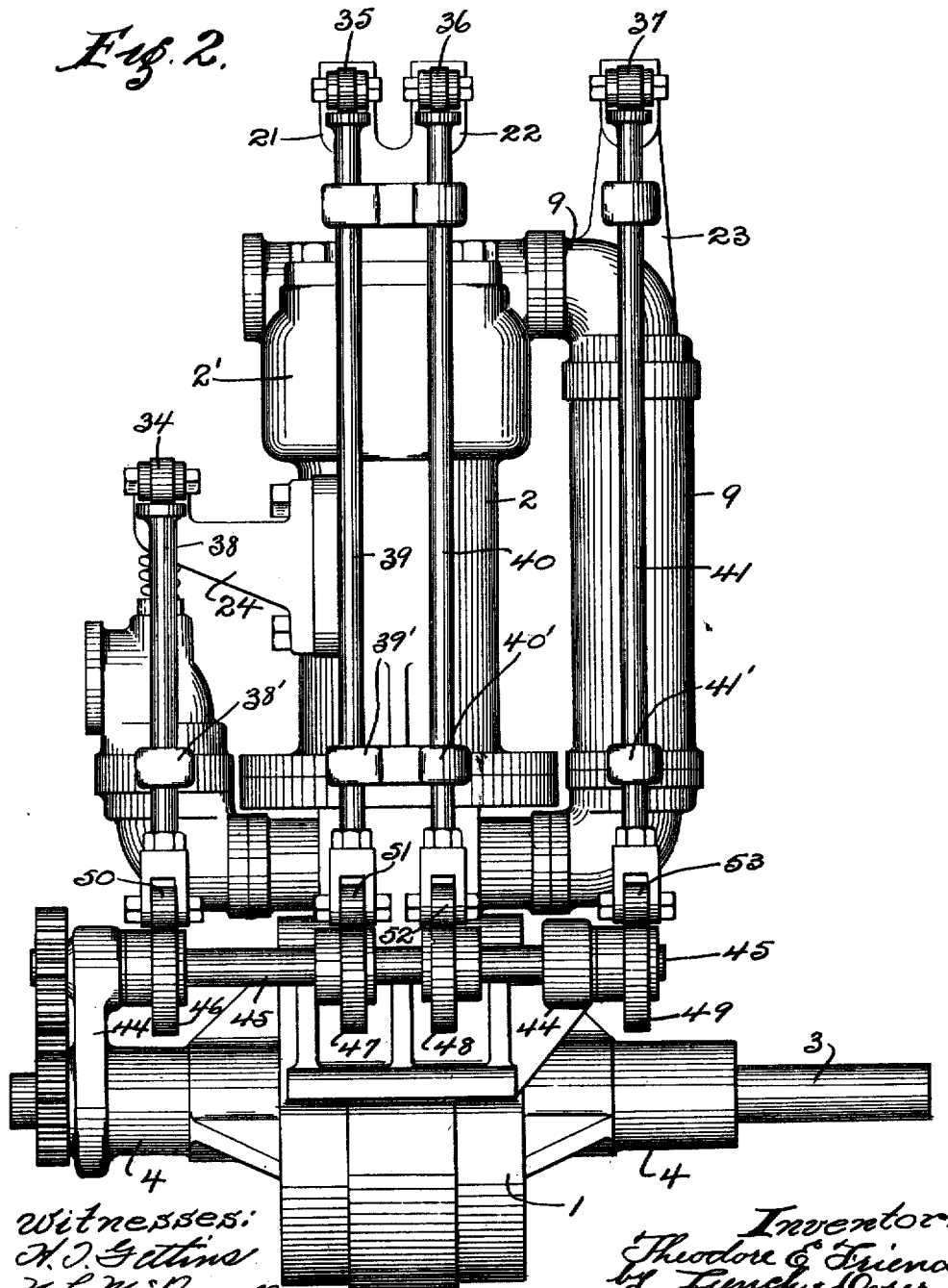

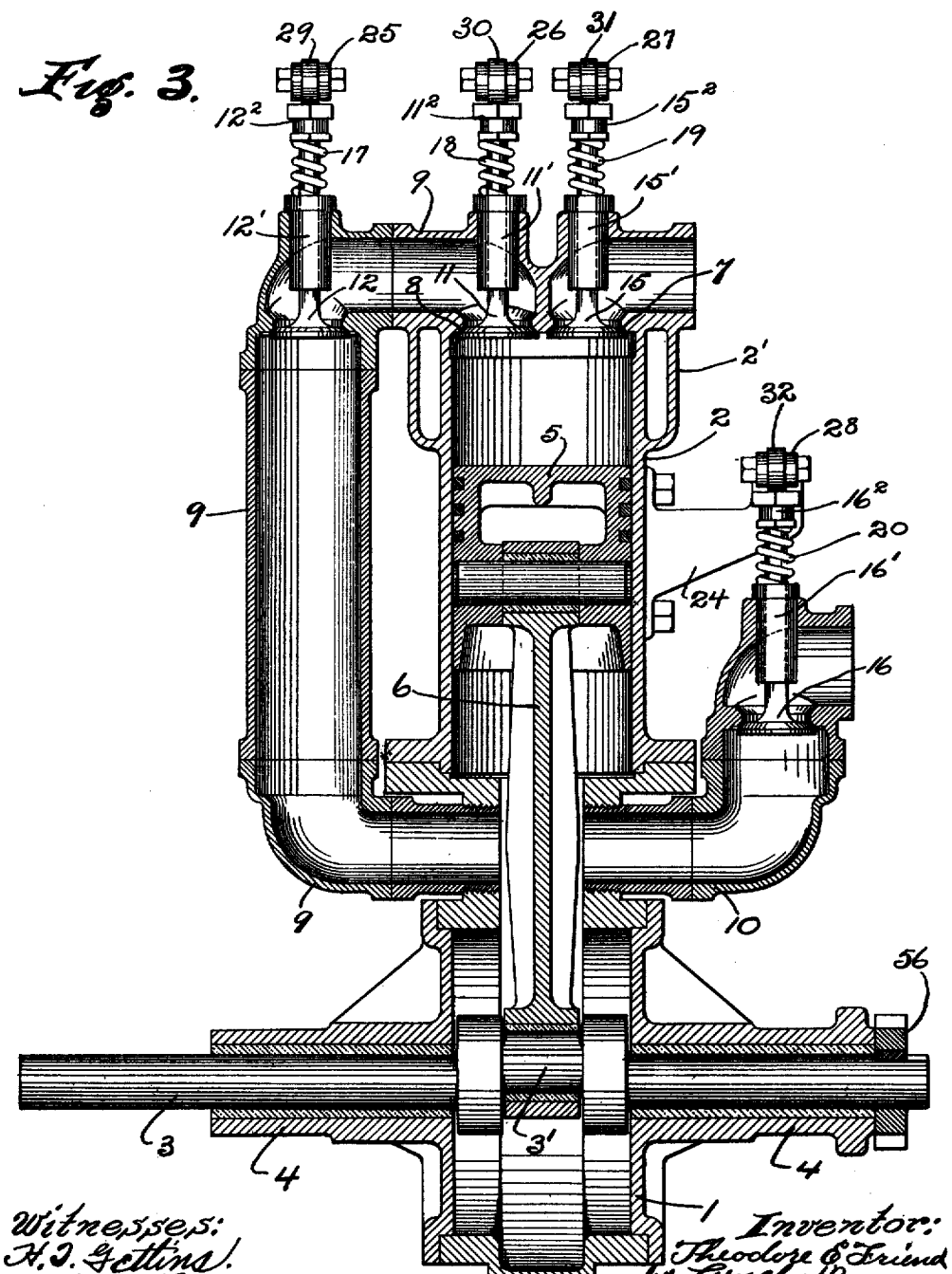

UNITED STATES PATENT OFFICE.

THEODORE E. FRIEND, OF NORWALK, OHIO.

INTERNAL-COMBUSTION ENGINE.

1,005,701.  Specification of Letters Patent. Patented Oct. 10, 1911.

Application filed September 24, 1909. Serial No. 519,362.

*To all whom it may concern:*

Be it known that I, THEODORE E. FRIEND, a citizen of the United States of America, residing at Norwalk, in the county of Huron and State of Ohio, have invented certain new and useful Improvements in Internal-Combustion Engines; and I hereby declare the following to be a full, clear, and exact description of the invention, such as will enable others skilled in the art to which it pertains to make and use the same.

This invention relates to improvements in explosive engines.

The object of this invention is to provide an engine having an arrangement of parts such as will secure the maximum horse power with the minimum consumption of fuel.

A further object of my invention is to secure a perfect mixing of the charge so as to secure the utmost efficiency from the fuel.

Another object of my invention is to prevent the overheating of the cylinder of the engine.

In the present explosive engines the charge of explosive admitted to the cylinder chamber during the suction stroke is too large and a full expansion of the charge cannot be obtained, a large portion of the charge passing out the exhaust port without being utilized. This causes an excessive consumption of fuel and prevents the proper mixing thereof reducing the efficiency of the fuel. Also as the charge is too large for the capacity of the cylinder the cylinder becomes greatly heated and even where cooling devices are used soon burns out. In my improved engine I overcome this by passing a portion of the charge out of said cylinder chamber before the compression and expansion takes place, leaving only the amount of explosive in the said cylinder chamber that can be fully expanded therein.

My invention may be further briefly summarized as consisting in certain novel details of construction and combination and arrangement of parts hereinafter described in the specification and pointed out in the claims.

Referring to the accompanying drawings Figure 1 is an end view of a four cycle engine constructed in accordance with my invention. Fig. 2 is a side view of the same. Fig. 3 is a central vertical section of the same.

Again referring to Figs. 1, 2 and 3 of the drawings 1 represents the crank casing of my engine which is made air tight and 2 represents the cylinder which is in open communication with the crank casing at its lower end. The cylinder 2 is shown provided with a water jacket 2'. A crank shaft 3 having a crank 3' is mounted in suitable bearings 4 arranged in the crank casing. In the cylinder 2 is arranged a piston 5 of the usual construction which is connected with the crank shaft 3 by means of a piston rod 6. At the top of the cylinder 2 is formed an exhaust port 7 and a port 8 which I term the bypassing port. A bypassing pipe 9 extends from the port 8 and communicates with the crank casing just below the cylinder. An inlet pipe 10 communicates with the crank casing at the opposite side from the bypassing pipe 9. A valve 11 is provided in the cylinder for closing the port 8 and a second valve 12 is arranged in the pipe 9 a short distance from the valve 11. Both the valves 11 and 12 are positively and simultaneously actuated by the operation of the engine as will be more fully explained. In the cylinder is arranged a valve 15 for closing the exhaust port and in the inlet pipe is a valve 16. These valves are also positively actuated by the operation of the engine, the operation of the valve 16 preceding the operation of the valve 15. The manner of mounting and operating said valves is as follows,—The valve stems of each of the valves 11, 12, 15 and 16 are arranged to slide through packing sleeves 11', 12', 15' and 16' and on the ends of the valve stems are rigidly secured heads or caps $11^2$, $12^2$, $15^2$, and $16^2$. On the valve stems between the heads and the packing rings are arranged coiled springs 17, 18, 19 and 20 respectively, the purpose of which is to hold the valves in their respective valve seats. In proximity to the respective valves are arranged brackets or supports 21, 22, 23 and 24 in which are fulcrumed levers 25, 26, 27 and 28 respectively, the forward ends of which are arranged to extend over the heads $11^2$, $12^2$, $15^2$ and $16^2$ on the respective valve stems and are provided with small rollers 29, 30, 31 and 32 respectively, which are arranged to come in contact with the said heads on the valve stems, the object of course being to reduce the friction between the ends of the levers and the heads on the valve stems. On the opposite ends of said levers are mounted rollers 34, 35, 36 and 37. Vertically arranged rods 38, 39, 40 and 41 are supported in brackets 38', 39', 40' and 41' so as to slide freely therein and the arrangement is such that the upper ends of said rods will always be in contact with the rollers 34, 35, 36 and 37 on the levers 25, 26, 27 and 28. On the ends of the rods 38, 39, 40 and 41 are mounted rollers 50, 51, 52 and 53. In suitable bearings 44 is journaled a shaft 45 which is arranged to extend under the lower ends of the rods 38, 39, 40 and 41 and on said shaft and arranged to come in contact with the rollers 50, 51, 52 and 53 are secured cam disks 46, 47, 48 and 49 respectively, and the arrangement of said cams is such that when the shaft 45 is rotated the rods 38, 39, 40 and 41 will be reciprocated at predetermined intervals, thereby rocking the levers 34, 35, 36 and 37 opening and closing the respective valves 11, 12, 15 and 16. Rigidly mounted on the end of said shaft 45 is a gear 55. The said gear 55 is connected to the gear 56 rigidly mounted on the end of the crank shaft 2 by means of two smaller intermeshing gears 57 and 58. The smaller gears 57 and 58 are provided to reduce the speed of the shaft 45 from the crank shaft 2. It will be readily seen that when the crank shaft 2 of the engine is rotated the gears 56, 57, 58 and 59 will cause the said shaft 45 and the cams mounted thereon to rotate.

The operation of my improved engine is as follows,—We will suppose that the engine has been cranked sufficiently to draw in enough of the fuel from the source of supply to fill the cylinder, the crank casing and the bypassing pipe and compress the charge in the cylinder, then when the charge is exploded the piston will be driven down in the cylinder during which operation all the valves will remain closed, then as the piston moves up in the cylinder to expel the burned gases, the exhaust valve 15 will be opened through the operation of the cam before described. When the piston starts to move down again on the suction stroke, the inlet valve 11 and the bypassing valve 12 will be opened permitting a new charge to enter the cylinder from the crank casing by way of the bypassing pipe, and the said valves 11 and 12 will remain open during the full downward stroke of the piston and during about two-thirds of the next upward stroke of the piston, so that a portion of the charge brought in on the downward stroke, will be expelled from the cylinder on the upward stroke leaving only the amount of explosive in the cylinder chamber that can be fully expanded therein and economically used. The valves 11 and 12 will then close and the explosive will be compressed during the remainder of the upward stroke of the piston. As soon as the valves 11 and 12 close and the compression starts the valve 16 in the inlet pipe is opened admitting a new charge to the crank casing and the said valve 16 will remain open during the period when the charge is being compressed and will be closed just before the explosion takes place.

What I claim is,—

1. In a four-cycle internal combustion engine, the combination of a cylinder, a piston reciprocable therein, a crank-shaft, a rod connecting piston with the crank, a case inclosing each crank and adjacent end of piston-rod and communicating with the cylinder, thus forming a gas-tight chamber in which the piston rod and crank operate, a by-pass pipe communicating with such chamber and having a main inlet valve at one end and an outlet valve at the end adjacent to the top of the cylinder, means for operating such valves at the required times, as specified, an inlet valve and an exhaust valve arranged at the head of each cylinder, and means for operating such valves in the cycle or order of succession stated, whereby as the piston descends or makes its suction stroke, a charge is forced or transferred from the crank chamber into the upper or working chamber of the cylinder and whereby as the piston makes the first part of its return or compression stroke, a portion of the admitted charge is forced back out of the cylinder into the crank-case chamber, the inlet valve of the cylinder being closed during the latter portion of the compression stroke so that a complete charge is retained and compressed in the cylinder, a fresh supply of gas being admitted to the by-pass and crank-case during such latter part of the compression stroke, as shown and described.

2. In an internal combustion engine, a cylinder provided with an intake port and an exhaust port, a crank case, a pipe connecting the intake port of the cylinder with said crank case, a valve for closing the intake port of said cylinder, a valve arranged to intercept the passage of fuel through said pipe, means for simultaneously operating the said valves, an intake pipe communicating with said crank case, a valve arranged in said intake pipe, a piston arranged in said cylinder, a crank shaft operatively connected with said piston, a shaft arranged to be driven by said crank shaft, cams arranged on the shaft and means arranged to be actuated by the cams for operating said valves, the arrangement being such that the exhaust port will be open during the exhaust stroke of the piston, the intake valve and the valve in the bypassing pipe will be open during the suction stroke and a portion of the compression stroke of said piston and the intake port to the crank case will be open only while the charge is being compressed in the cylinder.

In testimony whereof, I sign the foregoing specification, in the presence of two witnesses.

THEODORE E. FRIEND.

Witnesses:
VICTOR C. LYNCH,
N. L. MCDONNELL.

Copies of this patent may be obtained for five cents each, by addressing the "Commissioner of Patents, Washington, D. C."